United States Patent [19]
Hayakawa et al.

[11] Patent Number: 5,479,088
[45] Date of Patent: Dec. 26, 1995

[54] CHOPPER TYPE DC-DC CONVERTER

[75] Inventors: Toshiyuki Hayakawa; Hidenobu Ito; Shinichi Nakagawa, all of Kasugai, Japan

[73] Assignees: Fujitsu Limited, Kanagawa; Fujitsu VLSI Limited, Aichi, both of Japan

[21] Appl. No.: 279,105

[22] Filed: Jul. 22, 1994

[30] Foreign Application Priority Data

Aug. 20, 1993 [JP] Japan ................................. 5-206676

[51] Int. Cl.[6] ............................... G05F 1/40; G05F 1/44
[52] U.S. Cl. ........................................ 323/282; 323/288
[58] Field of Search .................................. 323/222, 237, 323/242, 266, 271, 282, 284, 285, 288, 326, 351; 363/16, 19, 21, 23, 25, 97, 124, 131

[56] References Cited

U.S. PATENT DOCUMENTS

| | | | |
|---|---|---|---|
| 4,311,956 | 1/1982 | Tolmie | 323/300 |
| 4,413,224 | 11/1983 | Krupka et al. | 323/222 |
| 4,785,262 | 11/1988 | Ryu et al. | 331/111 |
| 5,087,827 | 2/1992 | Hadwin | 307/246 |
| 5,373,225 | 12/1994 | Poletto et al. | 323/282 |
| 5,389,871 | 2/1995 | Otake | 323/282 |
| 5,399,958 | 3/1995 | Iyoda | 323/282 |

*Primary Examiner*—Matthew V. Nguyen
*Attorney, Agent, or Firm*—Nikaido, Marmelstein, Murray & Oram

[57] ABSTRACT

The DC-DC converter is disclosed, which has an output terminal connected to an external load, and produces a desired output voltage at the output terminal. An output capacitor in the converter has a first electrode connected to the output terminal and a second electrode. The charge/discharge regulator controls electrical connection between a DC power supply and the output capacitor to permit the capacitor to be charged or discharged. The DC-DC converter includes a first detecting circuit for detecting a change in the output voltage at the output terminal, and a second detecting circuit for detecting a variable load current flowing into the converter from the load via the output terminal. A voltage control circuit is provided in the converter, and controls a potential of the second electrode of the capacitor in such a manner as to nullify a variation in the output voltage, based on a result of detection of the output voltage by the first detecting circuit and on a result of detection of the load current by the second detecting circuit.

5 Claims, 9 Drawing Sheets

Fig.1 (Prior Art)

Fig.2 (Prior Art)
Output Waveform in Small Current Mode

Fig.3 (Prior Art)
Output Waveform in Large Current Mode

Fig.7
When transistor 6 is off.

Fig.8
When transistor 6 is on.

Fig. 9

Fig. 10
Output Waveform in Small Current Mode

Fig.11

Output Waveform in Large Current Mode

CHOPPER TYPE DC-DC CONVERTER

BACKGROUND OF THE INVENTION

1. Field of the Invention

The present invention relates generally to a DC-DC converter which boosts or reduces a supplied DC voltage to produce a different DC voltage. More particularly, this invention relates to improvements in reducing the power consumed in a DC-DC converter, reducing the ripple effect and shortening the rise time as characteristics of the converter's output voltage.

2. Description of the Related Art

The current popularity of portable electronic devices, like the cordless telephone, is due in part to the fact that these devices have become more compact and light. Such products commonly utilize a DC-DC converter in the power supply section of the device. From a design perspective, the output voltage from such a power supply should be stable and have as small a ripple as possible in order to improve the device's operating characteristics. It is likewise desirable that the DC-DC converter, utilized in the power supply of such devices, consume as little power as possible. Naturally, the lower the power consumption requirement of these devices, the fewer batteries are required for their operation.

Figure 1:
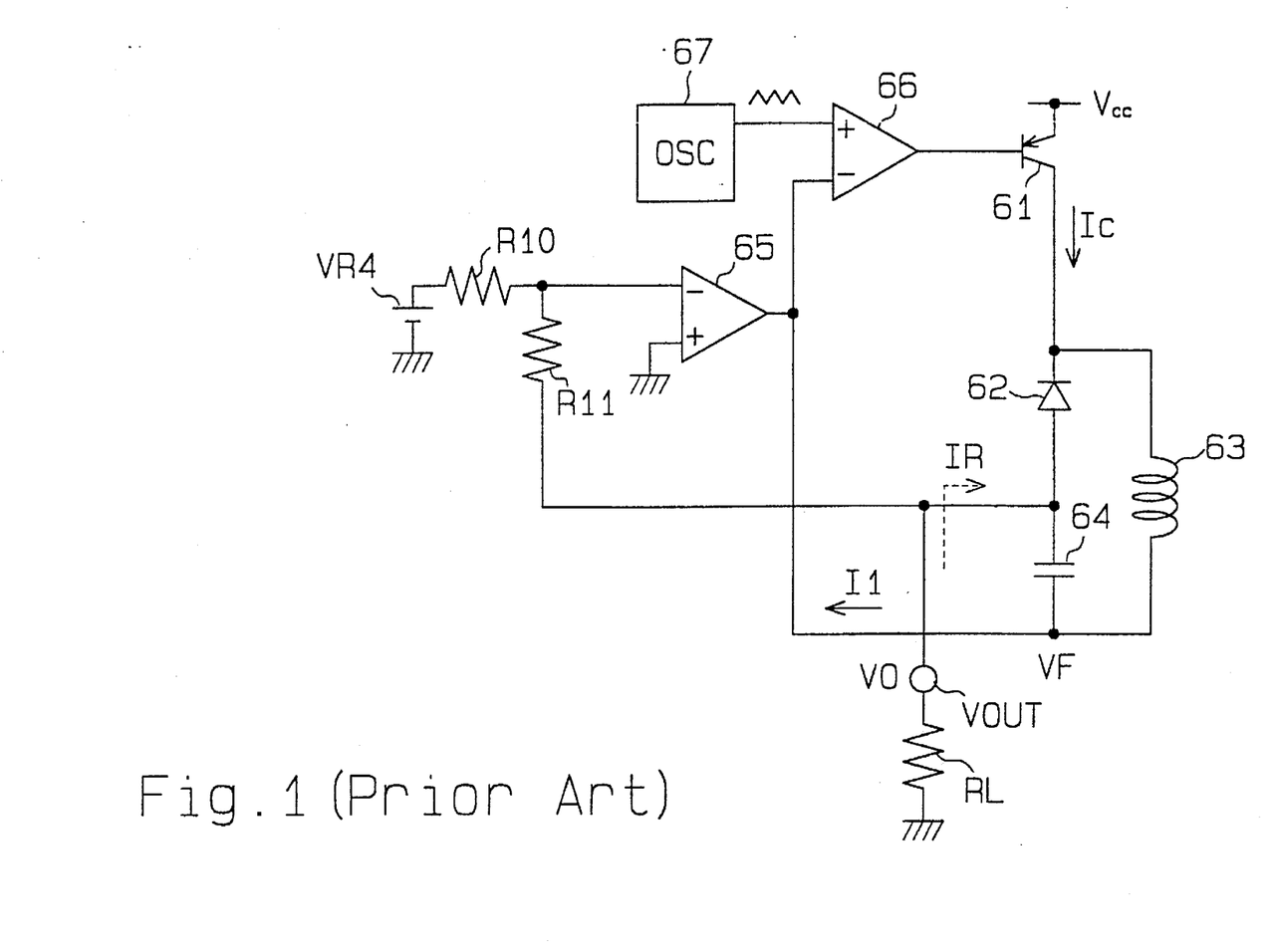
FIG. 1 is a circuit diagram of a chopper type DC-DC converter.

FIG. 1 illustrates the electric structure of a conventional chopper type DC-DC converter. A PNP transistor 61 has an emitter connected to a power supply Vcc, and a collector connected to the cathode of a flywheel diode 62. The anode of the diode 62 is connected to an output terminal VOUT as well as to the first electrode of an output capacitor 64. An induction coil 63 is connected between the cathode of the diode 62 and the second electrode of the capacitor 64.

A regulator section includes the transistor 61, diode 62, coil 63 and capacitor 64. Normal regulator section operation results in a negative output voltage V0 appearing at the first electrode of the capacitor 64 (i.e., the output terminal VOUT). The output voltage V0 is supplied to a load resistor RL connected between the output terminal VOUT and ground.

An operational amplifier (op-amp) 65 has an inverting input terminal, a non-inverting input terminal and an output terminal. The inverting input terminal of the op-amp 65 is connected to the high potential side of a reference power supply VR4 via resistor R10, and to the output terminal VOUT via a resistor R11. The non-inverting input terminal of the op-amp 65 is grounded (i.e., V=0). The output terminal of the op-amp 65 is connected to the second electrode of the capacitor 64. As constructed, op-amp 65 therefore forms an inverting amplifier. A voltage supplied from reference power supply VR4 and the output voltage V0, divided by the resistors R10 and R11, is applied to the inverting input terminal of op-amp 65. A voltage at the output terminal of the operational amplifier 65 sets the voltage at the inverting input terminal to ground level, due to the imaginary short-circuiting of the operational amplifier 65.

A comparator 66 has an inverting input terminal connected to the output terminal of the op-amp 65, a non-inverting input terminal connected to the oscillator 67 and an output terminal connected to the base of the PNP transistor 61. The oscillator 67 supplies the non-inverting input of comparator 66 with a triangular wave signal. The comparator 66 compares the voltage at its inverting input terminal with the voltage at its non-inverting input terminal and outputs a signal that turns the transistor 61 on or off based on the results of the comparison.

When the transistor 61 is turned on, a current flows across the induction coil 63 from the power supply Vcc. This current produces a voltage across the coil 63, which is positive on the cathode side of the diode 62. Since the diode 62 initially inhibits the conduction of the capacitor 64, the voltage across the capacitor 64 will not change. A load current IR, flowing into the output terminal VOUT from the ground via the load resistor RL, allows the capacitor 64 to discharge, and thereby changes the output voltage V0. A current I1, which is the sum of the load current IR and the current flowing across the coil 63, is supplied to the output terminal of the op-amp 65.

When the transistor 61 is turned off, the current supply from the power supply Vcc to the coil 63 is blocked. As a result, a counter electromotive force, negative on the cathode side of the diode 62, is generated across the coil 63. The counter electromotive force causes a current to flow across the coil 63 via the diode 62, to charge the capacitor 64. The load current IR flows through the diode 62 and coil 63, and flows into the output terminal of the op-amp 65 as the current I1.

The voltage at the output terminal of the op-amp 65 sets the voltage at its inverting input terminal to the ground level due to the imaginary short-circuiting of the operational amplifier 65. Op-amp 65 provides a voltage relative to the output voltage V0 which varies according to the charging and discharging of the capacitor 64. In other words, the operational amplifier 65 creates a feedback of the voltage VF at the second electrode of the capacitor 64 in accordance with the output voltage V0. Consequently a ripple appears on the voltage VF at the second electrode. As a result, the output voltage V0 at the output terminal VOUT is suppressed to 1/(GA+1) where GA is the gain of the feedback system. The ripple is likewise suppressed to 1/(GA+1).

Figure 2:
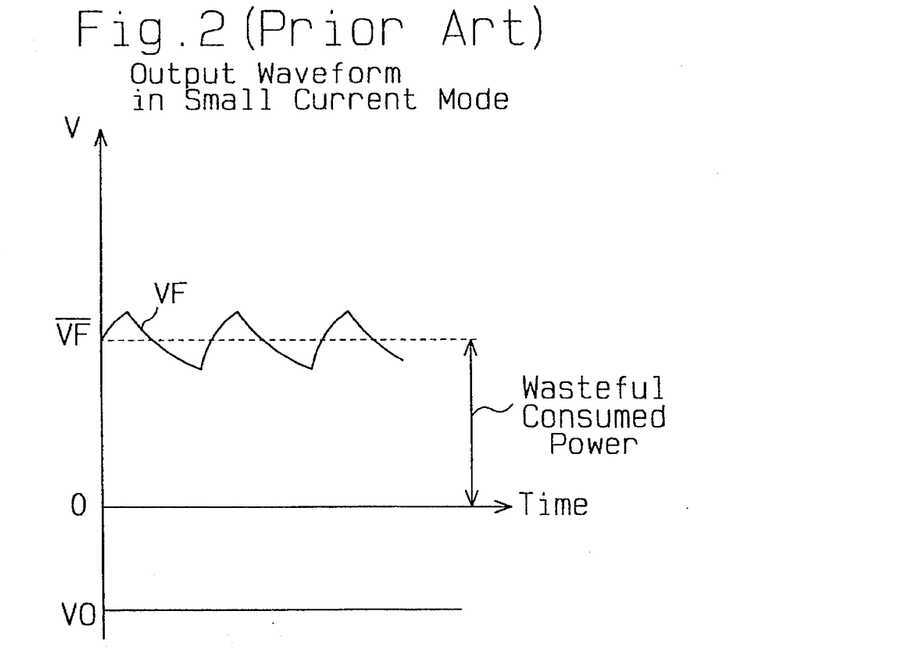
FIG. 2 is a diagram showing the waveform of the output voltage when the DC-DC converter outputs a small current.

Even with a relatively small load current IR, the averaged value /VF of the voltage VF increases as shown in FIG. 2. Consequently, the power consumption of the DC-DC converter is fairly large even with a small load current IR.

Figure 3:
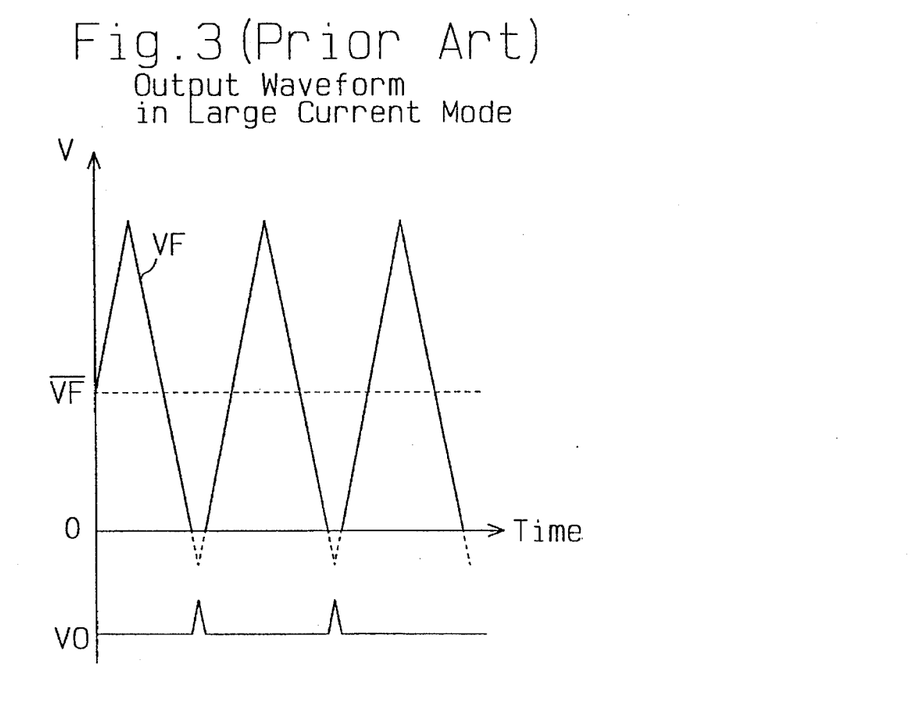
FIG. 3 is a diagram showing the waveform of the output voltage when the DC-DC converter outputs a large current.

With a relatively large load current IR, the ripple of the voltage VF becomes large as shown in FIG. 3. When the amplitude of the ripple increases and the voltage value temporarily falls to or below 0 volts, the output transistor (not shown) in the operational amplifier 65 becomes saturated since its operational range is only between the DC source voltage Vcc and 0 volt (ground). When saturated, however, this particular output transistor will produce an undesirable ripple on the output voltage V0 at the output terminal VOUT. To prevent this, the capacitance of output capacitor 64 is chosen to be relatively large. Using a large capacitance here results in making the rise time of the output voltage V0 undesirably long. Such a protracted rise time characteristic of output voltage V0, presents problems for using the DC-DC converter in systems requiring frequent and repeated powering on and off. In semiconductor devices, for example, the increasing trend to reduce the devices consumed power requires circuitry repeated powered on and off. The DC-DC converter as described is poorly suited for such devices.

Figure 4:
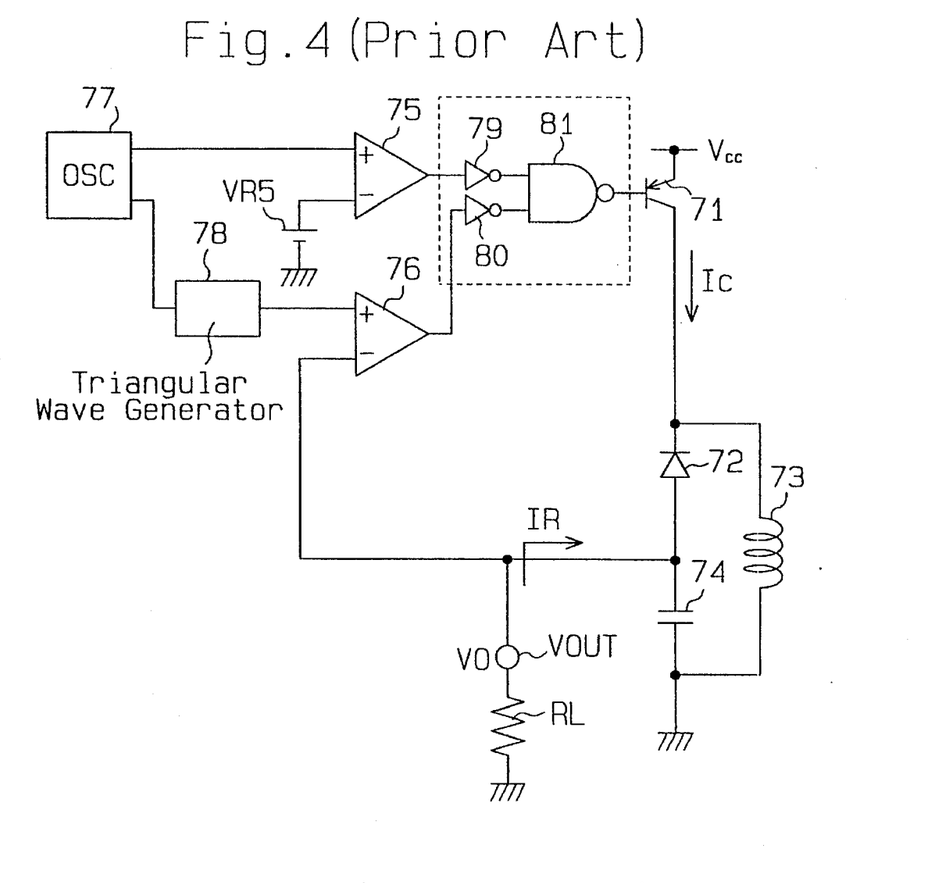
FIG. 4 is a circuit diagram of a chopper type DC-DC converter.

FIG. 4 illustrates the electric structure of another typical chopper type DC-DC converter. A PNP transistor 71 has an emitter connected to a power supply Vcc, and a collector connected to the cathode of a flywheel diode 72. The anode of the diode 72 is connected to an output terminal VOUT as well as to the first electrode of an output capacitor 74. An induction coil 73 is connected between the cathode of the diode 72 and the second electrode of the capacitor 74. The second electrode of the capacitor 74 is grounded.

A regulator section includes the transistor 71, diode 72, coil 73 and capacitor 74. A negative output voltage V0 appears at the first electrode of the capacitor 74 (i.e., the output terminal VOUT). The output voltage V0 is supplied to a load resistor RL connected between the output terminal VOUT and ground.

A first comparator 75 has a non-inverting input terminal connected to an oscillator 77, and an inverting input terminal connected to the high potential side of a reference power supply VR5. The oscillator 77 produces a square-wave or rectangular wave signal and sends it to the non-inverting input terminal of the comparator 75.

A second comparator 76 has a non-inverting input terminal connected to a triangular wave generator 78, and an inverting input terminal connected to the output terminal VOUT. The triangular wave generator 78 converts the rectangular wave signal from the oscillator 77 into a triangular wave, which is in turn output to the non-inverting input terminal of the second comparator 76. The output terminals of the comparators 75 and 76 are connected to a NAND gate 81 via inverters 79 and 80, respectively. The output terminal of the NAND gate 81 is connected to the base of the PNP transistor 71.

Figure 5:
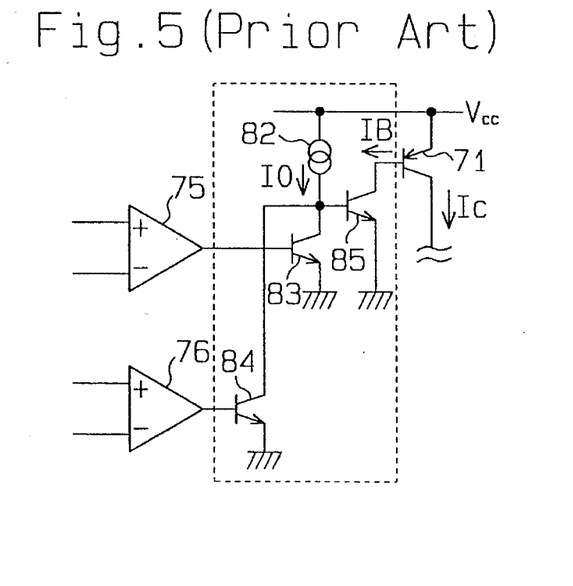
FIG. 5 is a detailed circuit diagram showing inverters and a NAND gate as shown in FIG. 4.

FIG. 5 is a detailed electric circuit diagram showing the inverters 79 and 80 and the NAND gate 81. A first NPN transistor 83 has a base connected to the first comparator 75, a collector connected via a constant current source 82 to the power supply Vcc, and an emitter connected to the ground. A second NPN transistor 84 has a base connected to the second comparator 76, a collector connected via the constant current source 82 to the power supply Vcc, and an emitter connected to the ground. A third NPN transistor 85 has a base connected to the collectors of both NPN transistors 83 and 84, a collector connected to the base of the PNP transistor 71, and an emitter connected to the ground.

The third NPN transistor 85 is turned on by a constant current I0 from the constant current source 82 only when the outputs of the comparators 75 and 76 are both low. When the NPN transistor 85 is turned on, the collector current of this transistor 85 or a base current IB of the transistor 71 is produced, and turns on the transistor 71 on.

With the transistor 71 turned on, a current IC flows across the induction coil 73 from the power supply Vcc. This current IC produces a voltage across the coil 73, positive on the cathode side of the diode 72. Since the diode 72 at this time hinders the current flowing through the capacitor 74, the charge on the capacitor 74 will not change. A load current IR is supplied to the capacitor 74 via the output terminal VOUT from the load resistor RL. This allows the capacitor 74 to be charged, which changes the output voltage V0.

When the output of one of the comparators 75 and 76 is high, the associated NPN transistor 83 or 84 receiving the high-level output is turned on. The constant current I0 of the constant current source 82 flows through the conducting NPN transistor 83 or 84. As a result, the third NPN transistor 85 is turned off. This prevents the base current IB of the transistor 71 from flowing, thus turning off the transistor 71.

When the transistor 71 is turned off, the current supply to the coil 73 from the power supply Vcc is blocked. As a result, a counter electromotive force, negative on the cathode side of the diode 72, is generated across the coil 73. This counter electromotive force causes a current to flow across the coil 73 via the diode 72, thus charging the capacitor 74.

The load current IR escapes to the ground through the diode 72 and coil 73.

The PNP transistor 71 is turned on or off by a constant base current IB proportional to the constant current I0. The duration that the transistor 71 is on is controlled in accordance with the output voltage V0 that varies with changes in load current IR. The duty ratio of the output signal of the second comparator 76 changes based on the variable output voltage V0. This change in the duty cycle changes the harmonic component of the current IC flowing through the transistor 71. Unfortunately, this variation in harmonic component would in turn produce an effect in any circuit coupled to the DC-DC converter, as for example, a radio frequency circuit.

When the load current IR is small, the current IC flowing across the coil 73 decreases to a relatively small value when the transistor 71 switches on. As the base current IB is constant, however, IB becomes larger than IC, rendering the transistor 71 in an oversaturated state. This consequently delays the switching action of the transistor 71 in the DC-DC converter. Also because the base current IB is larger than needed to permit the flow of the current IC power is wasted due to the surplus current. Additionally, with a decreasing switching speed, the DC-DC converter can not be used for high frequency switching. To permit high frequency switching, the inductance across coil 73 should be relatively large. This would however prevent a reduction to be made in the size of the electronic device incorporating such a DC-DC converter.

If the transistor 71 is integrated together with other devices on a P type substrate, the transistor 71 has a PNP structure in which P type regions, used for the emitter and collector, are formed in an N type well that forms the base. With this PNP structure, when the base current IB becomes larger than the current IC, the emitter and collector have nearly the same potentials. The potentials of both are higher than the potential of the P type substrate. This in effect creates a parasitic PNP transistor. As a result, a large current is likely to flow through the P type substrate, further increasing a waste in the power consumed by the DC-DC converter.

SUMMARY OF THE INVENTION

Accordingly, it is a primary objective of the present invention to provide a DC-DC converter, which reduces the consumed power when the DC-DC converter has a small output current, reduces the ripple characteristic of the output voltage when the DC-DC converter has a large output current, and decreases the rise time of the output voltage.

It is another objective of this invention to provide a DC-DC converter which prevents a switching transistor from saturating by maintaining the duty cycle of the switching transistor at a constant rate, which additionally allows for transistor's switching frequency to be increased.

To achieve the foregoing and other objects and in accordance with the purpose of the present invention, an improved DC-DC converter is provided. The present invention has been devised based on the fact that a DC-DC converter actually has power consumption, although it is generally understood that a DC-DC converter consume no power. To improve the circuit operation, the DC-DC converter according to the present invention is provided with a current detector to detect the power consumption.

The DC-DC converter according to the present invention has an output terminal to be connected to an external load, and produces a desired output voltage at the output terminal based on a voltage from a DC power supply. The DC-DC converter includes an output capacitor having a first electrode connected to the output terminal and a second electrode, and a charge/discharge regulator. The charge/discharge regulator controls electrical connection between the DC power supply and the output capacitor to permit the output capacitor to be charged or discharged, whereby a potential of the first electrode of the output capacitor is set to the desired output voltage different from a potential of the DC power supply.

The DC-DC converter further includes a first detecting circuit for detecting a change in the output voltage at the output terminal, and a second detecting circuit for detecting a variable load current flowing into the DC-DC converter from the load via the output terminal. A voltage control circuit is provided in the DC-DC converter, and controls a potential of the second electrode of the output capacitor in such a manner as to nullify a variation in the output voltage, based on a result of detection of the output voltage by the first detecting circuit and on a result of detection of the load current by the second detecting circuit.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

FIGS. 1 through 3 illustrate a conventional DC-DC converter:

FIGS. 4 and 5 illustrate an another conventional DC-DC converter:

FIGS. 6 through 14 illustrate a first embodiment of the present invention:

FIG. 8 is a diagram for explaining the flow of a load current when a transistor 6 shown in FIG. 6 is turned on;

DETAILED DESCRIPTION OF THE PREFERRED EMBODIMENTS

First Embodiment

Figure 6:
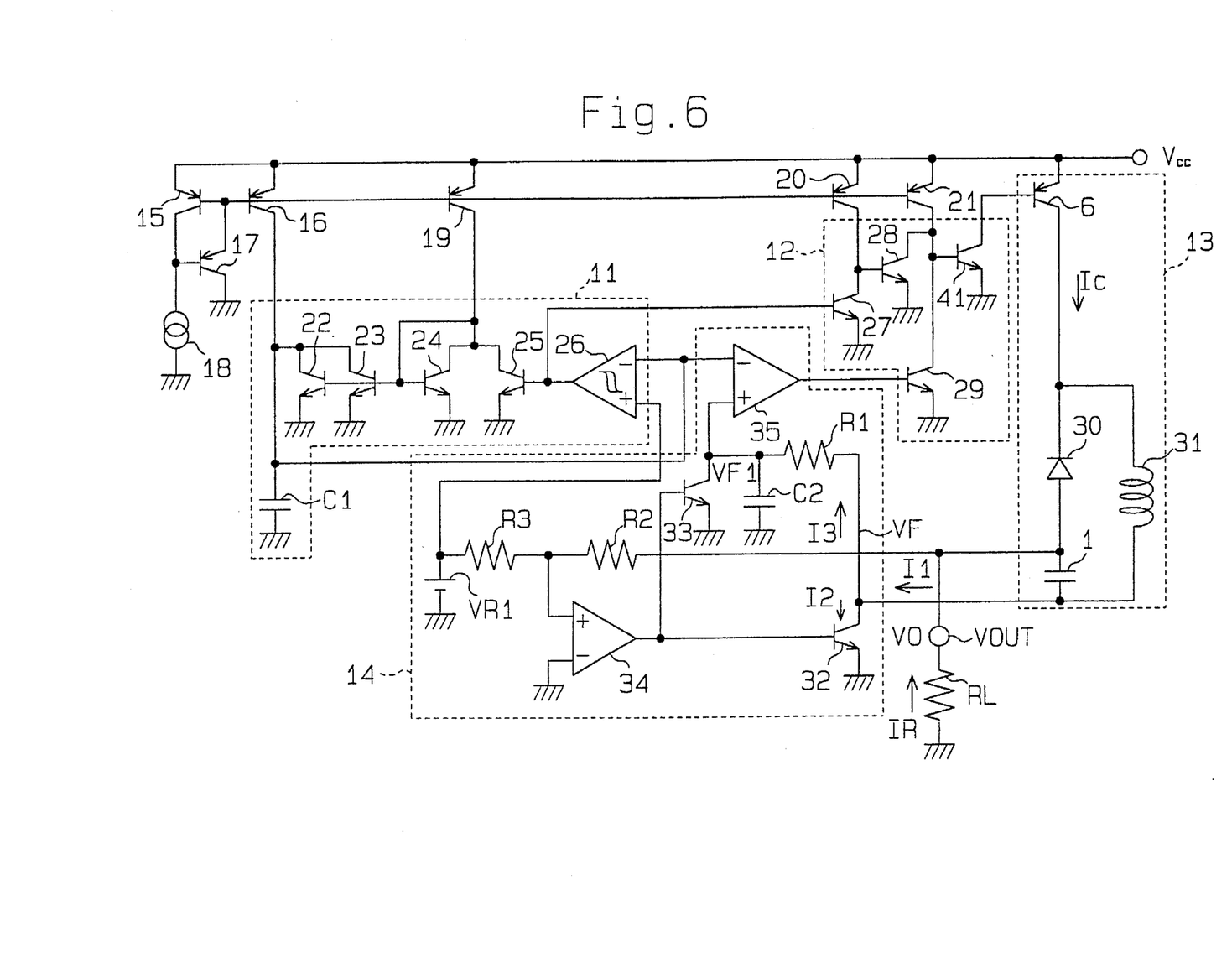
FIG. 6 is a circuit diagram of a chopper type DC-DC converter.

A chopper type DC-DC converter according to a first embodiment of the present invention will now be described with reference to FIGS. 6 through 14. As shown in FIG. 6, PNP transistors 15 and 16 have emitters connected to a DC power supply Vcc, and bases connected to the emitter of a PNP transistor 17. The transistor 17 further has a collector which is grounded, and a base connected to a constant current source 18. The transistor 15 has a collector connected to the constant current source 18 when the constant current source 18 is activated, the transistor 17 switches on and the transistors 15 and 16 function as a current mirror circuit.

PNP transistors 19, 20 and 21 have emitters connected to the DC power supply Vcc, and bases connected to the emitter of the transistor 17. Like the transistors 15 and 16, therefore, those transistors 19 to 21 function as a current mirror circuit.

An oscillator 11 includes four NPN transistors 22 to 25, a hysteresis comparator 26 and a capacitor C1. The capacitor C1 is connected between the collector of the transistor 16 and the ground. The transistors 22 and 23 have collectors connected to the collector of the transistor 16, and emitters connected to the ground.

The transistors 24 and 25 have collectors connected to the collector of the transistor 19, and emitters connected to the ground. The transistor 24 further has a base connected to its own collector and to the bases of the transistors 22 and 23. The transistor 25 has its base connected to the output terminal of the hysteresis comparator 26 and thereby receives the output of the comparator 26.

The non-inverting input terminal of the hysteresis comparator 26 is coupled to a reference power supply VR1 in a detecting circuit section 14. The corresponding inverting input terminal is coupled to and supplied with the voltage of capacitor C1. This hysteresis comparator 26 compares the reference source voltage VR1 with the voltage of the capacitor C1.

When the output of the hysteresis comparator 26 is high, the transistor 25 turns on and switches the transistors 24, 22 and 23 off. This causes the capacitor C1 to charge to a predetermined voltage level at which time the output of the hysteresis comparator 26 goes low. The low-level output turns off the transistor 25, causing the transistors 24, 22 and 23 to switch on. This discharges the capacitor C1. When the capacitor C1 is discharged to a predetermined voltage level, the output of the hysteresis comparator 26 once again goes high. Thereafter, the charging and discharging actions are repeated allowing the oscillation of the oscillator 11.

A regulator 13 includes a capacitor 1, a PNP transistor 6, a flywheel diode 30 and an induction coil 31. The PNP transistor 6 has an emitter connected to the DC power supply Vcc, and a collector connected to the cathode of the flywheel diode 30. The anode of the diode 30 is connected to the output terminal VOUT as well as to the first electrode of the capacitor 1. The coil 31 is connected between the cathode of the diode 30 and the second electrode of the capacitor 1. As the operation of the regulator 13, a negative output voltage V0 appears at the first electrode of the capacitor 1. A load resistor RL, connected between the output terminal VOUT and ground, represents the resistance of an external circuit to which this DC-DC converter is to be connected.

The detecting control circuit 14 includes three resistors R1, R2 and R3, two NPN transistors 32 and 33, an operational amplifier (op-amp) 34, a comparator 35, a capacitor C2 and the reference power supply VR1. The non-inverting input terminal of the operational amplifier 34 is connected both to the high-potential side of the reference power supply via the resistor R3 and to the output terminal VOUT via the resistor R2.

Therefore, the non-inverting input terminal of the op-amp 34 is supplied with a voltage obtained by dividing the reference source voltage VR1 and the voltage at the output terminal VOUT by the resistors R2 and R3. The op-amp 34 has its inverting input terminal grounded and its output terminal connected to the bases of the transistors 32 and 33.

The transistor 32 has its collector connected to the coil-side electrode of the capacitor 1 and its emitter grounded. The transistor 33 has its collector connected via the resistor R1 to the collector of the transistor 32 and its emitter grounded. The ratio of the emitter area used in the transistor 32 to that used in the transistor 33 is set to n:1 (n>1). In this embodiment, this ratio is set to 20:1. The capacitor C2 is connected between the collector of the transistor 33 and the ground. A voltage VF1 of the capacitor C2 is applied to the collector of the transistor 33.

The comparator 35 has a non-inverting input terminal connected to the collector of the transistor 33 to receive the voltage VF1, and an inverting input terminal to which the voltage of the capacitor C1 is input.

A controller 12 includes four NPN transistors 27 to 29 and 41. The transistor 29 has a collector connected to the collector of the transistor 21, an emitter connected to the ground, and a base which receives the output signal of the comparator 35.

The transistor 41 has a collector connected to the base of the transistor 6, an emitter connected to the ground, and a base connected to the collector of the transistor 21.

The transistor 27 has a collector connected to the collector of the transistor 20, an emitter connected to the ground, and a base which receives the output of the hysteresis comparator 26. The transistor 28 has a collector connected to the collector of the transistor 21, an emitter connected to the ground, and a base connected to the collector of the transistor 20.

The transistor 41 is turned on by the current from the transistor 21 only when the output of the hysteresis comparator 26 is high and when the output of the comparator 35 is low. When the transistor 41 turns on, the collector current flows through the transistor 41, i.e., the base current IB flows through the transistor 6 and allows the transistor 6 to turn on.

Figure 7:
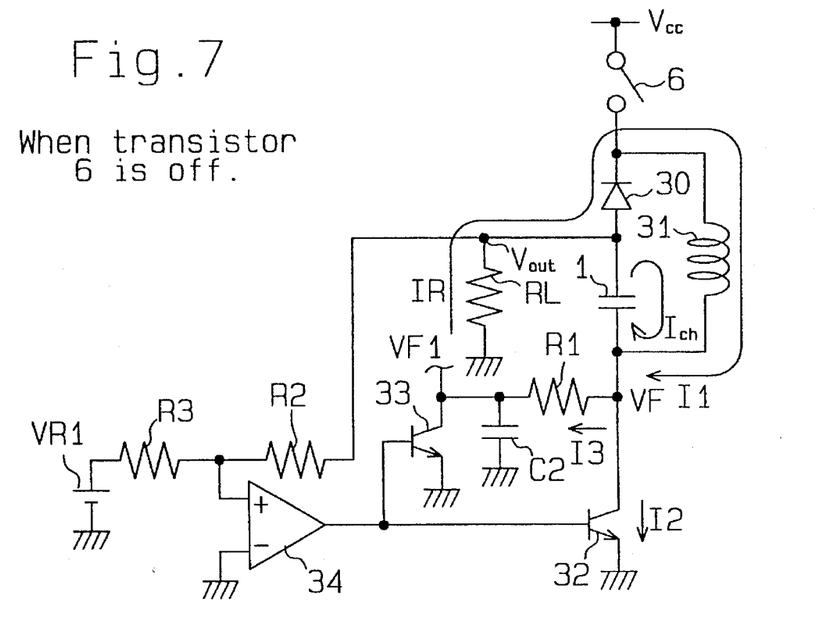
FIG. 7 is a diagram for explaining the flow of a load current when a transistor 6 shown in FIG. 6 is turned off.

When the transistor 6 is turned off, the current supply to the coil 31 from the power supply Vcc is blocked as shown in FIG. 7. As a result, counter electromotive force which is negative on the diode side is generated across the coil 31. The counter electromotive force causes a current Ich to flow across the coil 31 via the diode 30, thus charging the capacitor 1. The load current IR flows through the diode 30 and coil 31 as a current I1. This current I1 is divided into currents I2 and I3, which flow to the ground via the transistors 32 and 33, respectively. The ratio of the current I2 to the current I3 is determined by the emitter area ratio of the transistors 32 and 33 (n: 1). In this embodiment, with the current I2 taken as 1, the current I3 becomes 1/20 of I2. In this case, the values of the currents I2 and I3 are respective coefficient times as large as that of the current I1 (i.e., IR).

Figure 8:
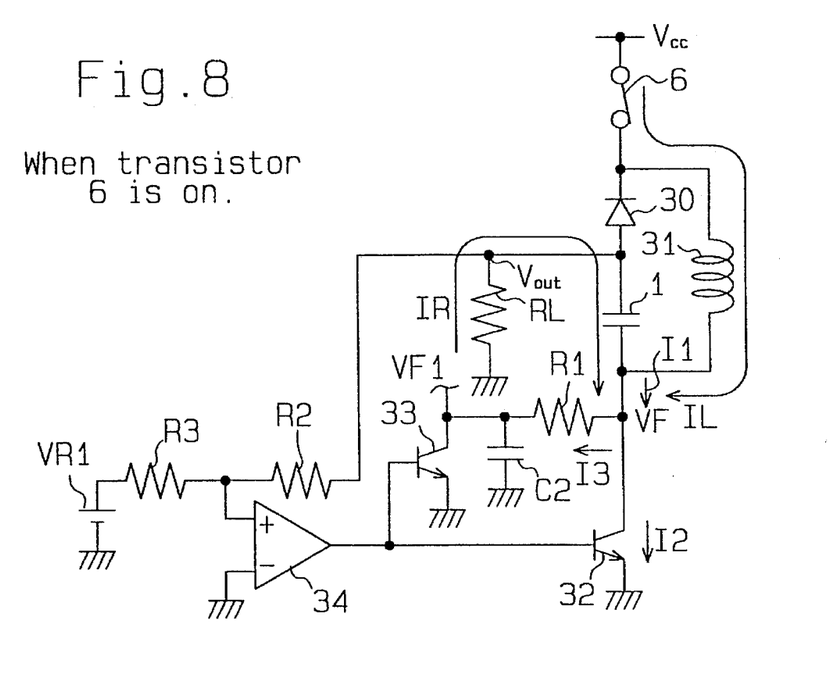

When the transistor 6 is turned on, a current IL flows across the coil 31 from the power supply Vcc, as shown in FIG. 8. This current IL produces a voltage across the coil 31, which is positive on the diode side. Since the diode 30 is biased in the opposite direction, however, the charges in the capacitor 1 are not affected. The load current IR flows into the output terminal VOUT from the ground via the load resistor RL. Because of this load current IR, the capacitor 1 discharges which in turn allows the output voltage V0 to change. The current I1 (i.e., IR+IL), the sum of the load current IR and the current IL flowing across the coil 31, is divided into the currents I2 and I3 according to the relationship (I2:I3=20:1). These currents flow to ground via the respective transistors 32 and 33. In this case, the values of the currents I2 and I3 are respective coefficient times as large as that of the current I1 (=IR). The value of current I1 thus increases by the amount of current IL flowing across the coil 31. This is in contrast with the case when the transistor 6 is turned off.

Figure 9:
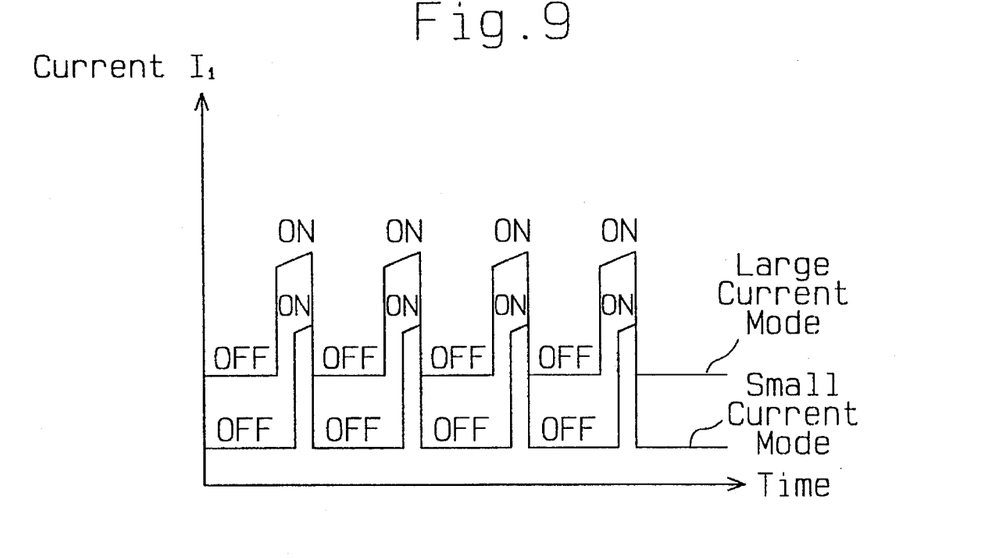
FIG. 9 is a diagram showing the time-dependent variation in output current I1 shown in FIGS. 7 and 8.

FIG. 9 shows the time-dependent variation in current I1 according to whether the transistor 6 is turned on or off. With a small load current IR, the current IC is also small. This causes the current I1 to become small. On the other hand, with a large load current IR, the current IC becomes large, which in turn causes the current I1 to become large. If the transistor 6 is turned on with the current I1 at a relatively small value, the current I1 will increase just slightly. Consequently, the duration which transistor 6 is on will be relatively short. Conversely if the transistor 6 is turned on with current I1 at a relatively large value, the value of current I1 will significantly increase and the duration of time that transistor 6 stays on will be relatively long. From the above, the current I1 and load current IR can be said to have a proportional relationship regardless of whether the transistor 6 is turned on or off. The load current IR and the currents I2 and I3 can also be said to have a proportional relationship. Therefore, the voltage VF at the second electrode of the capacitor 1 varies in proportion to the load current IR.

The voltage VF is proportional to the output voltage V0, which is controlled based on the output voltage of the operational amplifier 34. That is, the output voltage of the operational amplifier 34 changes in such a way to nullify a change in output voltage V0. For example, as the output voltage V0 is negative and tends to rise, the operational amplifier 34 gives a positive voltage to the base of the transistor 32 in accordance with the increase in output voltage V0. The current I2, which decreases the voltage VF to nullify the rise in output voltage V0, flows through the transistor 32, so that the output voltage V0 is kept substantially constant.

The voltage VF1 relative to the voltage VF is input to the comparator 35. When the voltage VF or output voltage V0 is negative and tends to rise, the comparator 35 controls the duty ratio in such a manner as to negate the rise in output voltage V0, thereby keeping the output voltage V0 constant.

As the output voltage V0 is negative and tends to decrease further, the operational amplifier 34 gives a positive voltage to the base of the transistor 32 in accordance with the decrease in output voltage V0. The current I2, which increases the voltage VF to nullify the drop in output voltage V0, flows through the transistor 32, so that the output voltage V0 is kept substantially constant.

The voltage VF1 is input to the comparator 35. When the voltage VF or output voltage V0 is negative and tends to drop further, the comparator 35 controls the duty ratio in such a manner as to negate the decrease in output voltage V0, thereby keeping the output voltage V0 constant.

Figure 10:
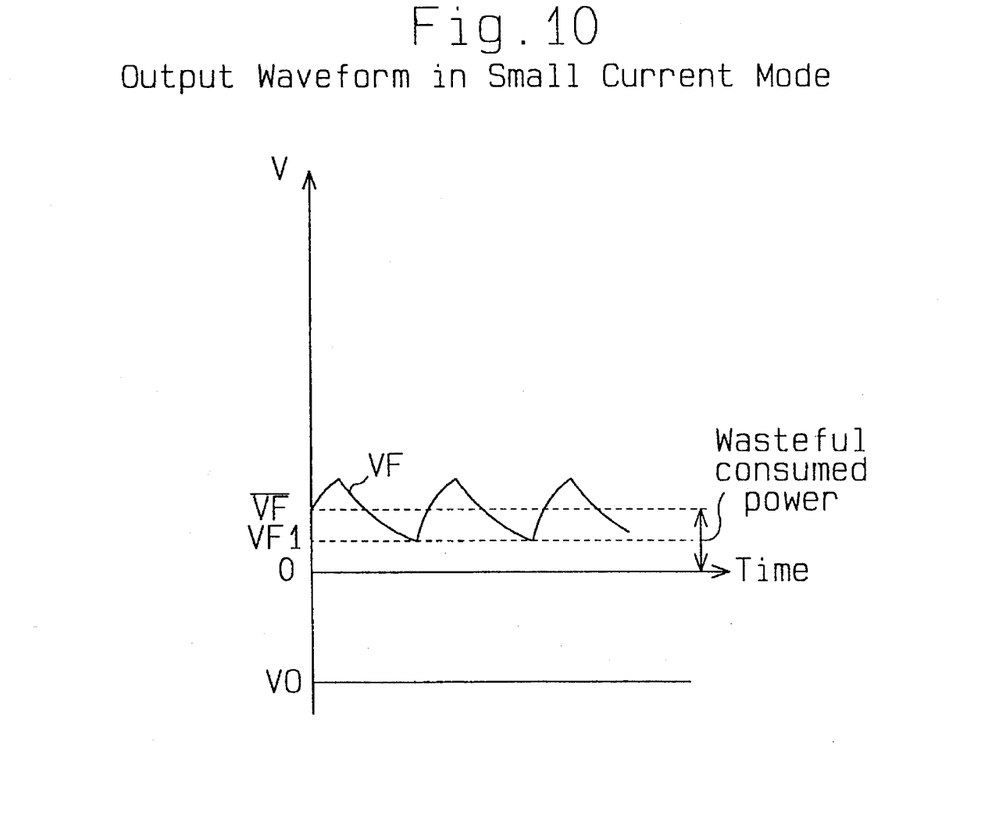
FIG. 10 is a diagram showing the waveform of the output voltage when the DC-DC converter outputs a small current.

According to this embodiment, when the current I1 is small, the current I3 is also small, reducing the potential difference between the voltage VF and voltage VF1 as shown in FIG. 10. The average value /VF of the voltage VF therefore becomes small, allowing the consumed power of the DC-DC converter to be reduced. Further, the ripple of the voltage VF becomes small so that the output voltage V0 is hardly affected by the ripple of the voltage VF.

Figure 11:
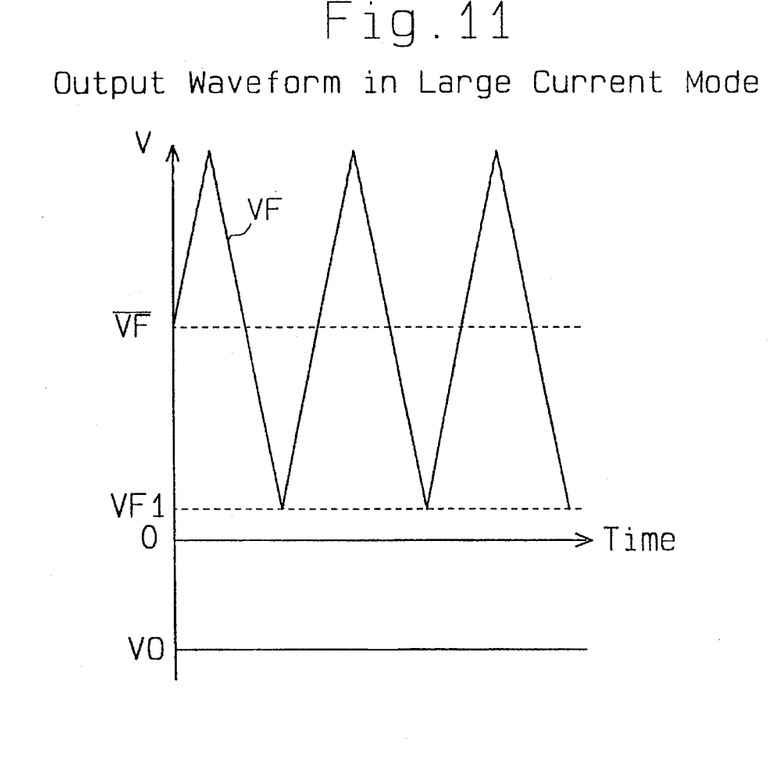
FIG. 11 is a diagram showing the waveform of the output voltage when the DC-DC converter outputs a large current.

According to this embodiment, when the current I1 is large, the currents I2 and I3 also become large, as shown in FIG. 11. As the current I3 increases, the voltage drop to the voltage VF1 from the voltage VF increases. Since the emitter area of the transistor 32 is n (=20) times that of the transistor 33, however, the transistor 32 is not saturated and can permit the current I2 to flow therethrough. When the current I1 is large, therefore, the average value /VF of the voltage VF becomes large, the influence of the ripple on the voltage V0 can be eliminated although the consumed current of the DC-DC converter is increased.

Since the influence of the ripple on the voltage V0 can be eliminated even when the current I1 is large, the capacitor 1 can have a small capacitance. This can contribute to shortening the rising time of the output voltage V0 in the DC-DC converter.

According to the present invention, as described above, it is possible to reduce the consumed power when the output current of the DC-DC converter is small, to reduce the ripple included in the output voltage when the output current of the DC-DC converter is large, and to shorten the rising time of the output voltage.

Figure 12:
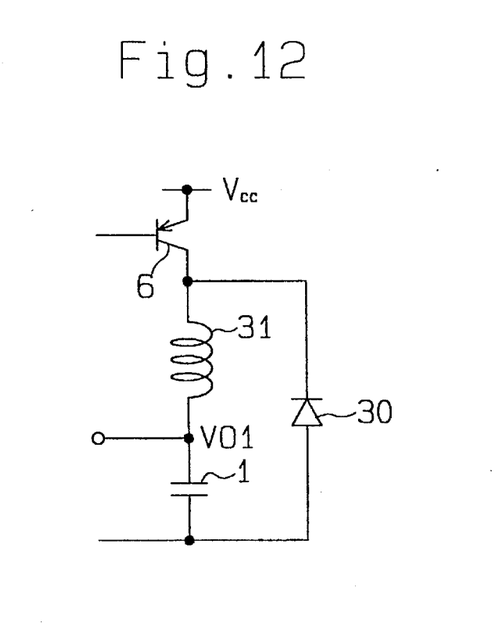
FIG. 12 is a circuit diagram showing another example of a regulator.
Figure 13:
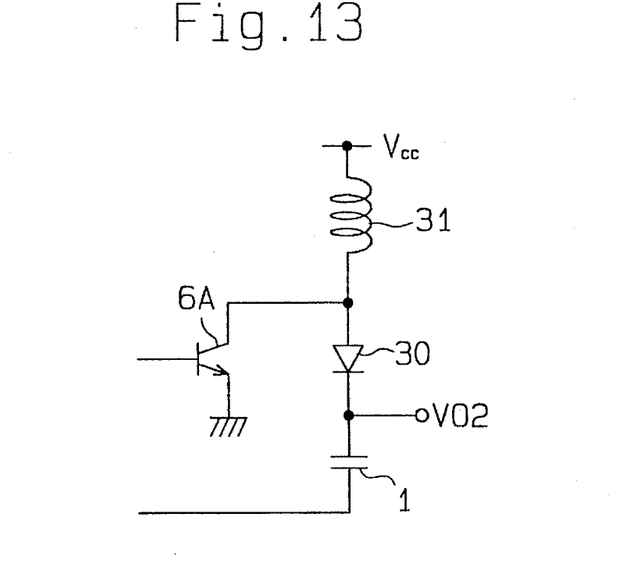
FIG. 13 is a circuit diagram showing a different example of the regulator.

The regulator 13 of the DC-DC converter as shown in FIG. 6 may be replaced with the regulators shown in FIGS. 12 and 13. The regulator in FIG. 12 is of a step-down type in which the diode 30 and coil 31 are exchanged. This regulator can generate a positive output voltage V01 lower than the source voltage Vcc from the output terminal VOUT.

The regulator in FIG. 13 is of a step-up type in which the coil 31 is connected between the power supply Vcc and the anode of the diode 30. The capacitor 1 is connected to the cathode of the diode 30. A transistor 6A has a collector connected to the anode of the diode 30 and an emitter connected to the ground. This regulator can generate a positive output voltage V02 higher than the source voltage Vcc from the output terminal VOUT.

Figure 14:
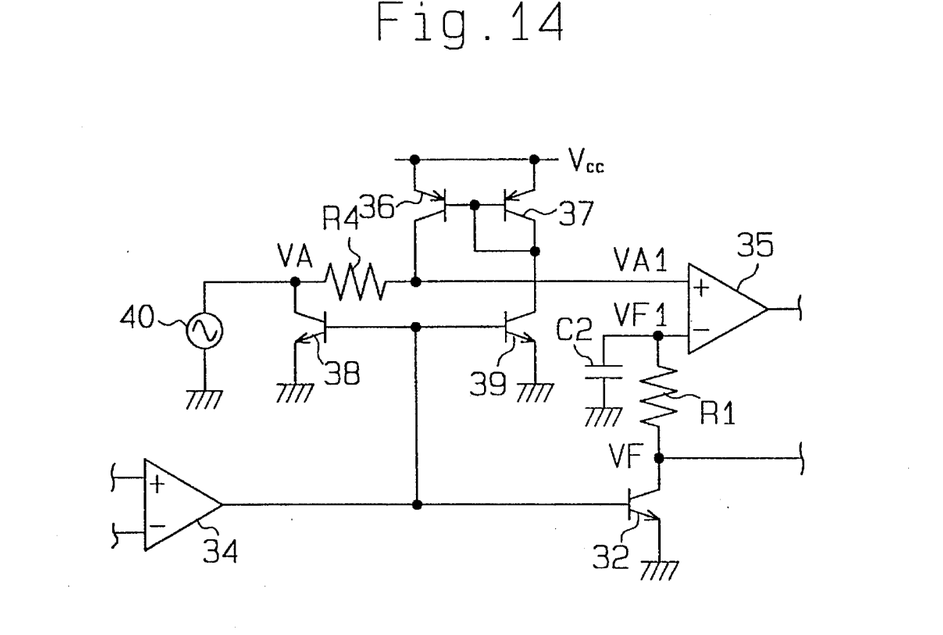
FIG. 14 is a circuit diagram showing another example of a detector.

The detecting control circuit 14 of the DC-DC converter shown in FIG. 6 may be replaced with a circuit as shown in FIG. 14.

In FIG. 14, the comparator 35 has a non-inverting input terminal, an inverting input terminal and an output terminal. The non-inverting input terminal is connected via a resistor R4 to an oscillator 40, which outputs a triangular wave of a predetermined period. The non-inverting input terminal is also connected to a PNP transistor 36 which constitutes a current mirror circuit. The capacitor C2 is connected between the inverting input terminal of the comparator 35 and the ground. This inverting input terminal is connected via the resistor R1 to the collector of the NPN transistor 32 in order to receive the voltage VF1. An NPN transistor 38 has its collector connected to the oscillator 40. A PNP transistor 37 and the transistor 36 constitute a current mirror circuit. The collector of the transistor 37 is connected to the collector of an NPN transistor 39. The output terminal of the operational amplifier 34 is connected to the bases of the transistors 32, 38 and 39.

In this detecting control circuit, the transistor 39 functions as a constant current source by the output voltage of the operational amplifier 34, permitting equal currents to flow through the transistors 36 and 37. The current from the transistor 36 flows into the transistor 38 via the resistor R4, causing a voltage drop across the resistor R4. Provided that the oscillator 40 is outputting an oscillation signal having a voltage level of VA, therefore, the oscillator 40 can input a voltage VA1 (=VA+ΔV), the sum of the voltage VA and the voltage drop ΔV across the resistor R4, to the non-inverting input terminal of the comparator 35.

Second Embodiment

A second embodiment of the present invention will now be described with reference to FIG. 15. For the sake of convenience of explanation, the same reference numerals as the components of the DC-DC converter in FIG. 6 are also given to the corresponding or identical components of the second embodiment, and some of their descriptions will be omitted.

Figure 15:
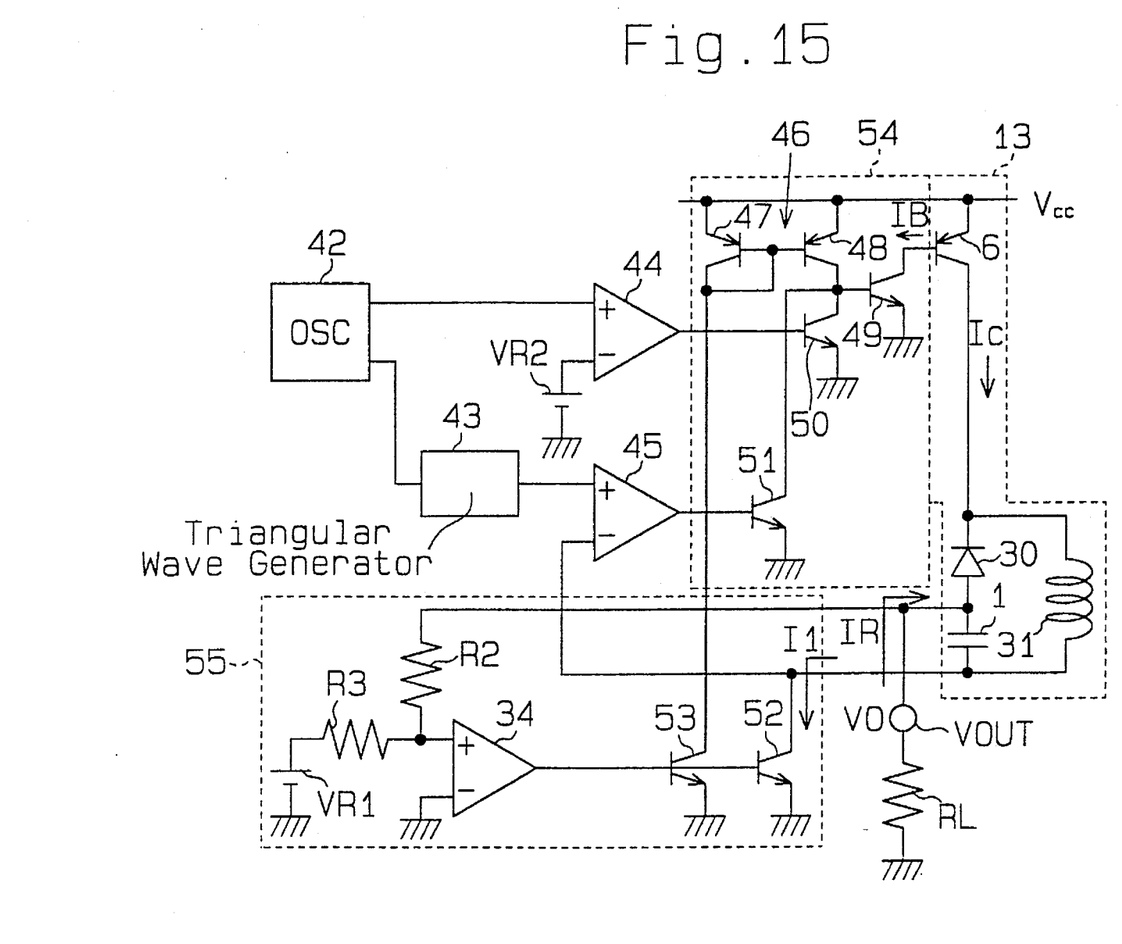
FIG. 15 is a circuit diagram showing a chopper type DC-DC converter according to a second embodiment of the present invention.

FIG. 15 shows a chopper type DC-DC converter. A comparator 44 has a non-inverting input terminal connected to an oscillator 42 to receive a rectangular wave signal from the oscillator 42, and an inverting input terminal connected to the high-potential side of a reference power supply VR2. A comparator 45 has a non-inverting input terminal connected to a triangular wave generator 43 and an inverting input terminal connected to the coil side electrode of a capacitor 1. The triangular wave generator 43 shapes the square wave from the oscillator 42 into a triangular wave and supplies the triangular wave signal to the non-inverting input terminal of the comparator 45.

A detecting control circuit 55 includes two resistors R2 and R3, two NPN transistors 52 and 53, an operational amplifier 34 and a reference power supply VR1. The operational amplifier 34 has a non-inverting input terminal, an inverting input terminal and an output terminal. The non-inverting input terminal of the operational amplifier 34 is connected via the resistor R3 to the high-potential side of the reference power supply VR1, and is connected via the resistor R2 to the output terminal VOUT.

Therefore, the non-inverting input terminal of the operational amplifier 34 is applied with a voltage which is obtained by dividing the reference source voltage VR1 and the output voltage V0 at the output terminal VOUT by the resistors R2 and R3. The inverting input terminal of the operational amplifier 34 is connected to the ground, while the output terminal of this amplifier 34 is connected to the bases of the transistors 52 and 53. When the output voltage V0 tends to increase or decrease based on an increase or a decrease in load current IR, the operational amplifier 34 acts to increase or reduce the output of the comparator 45. In other words, the operational amplifier 34 detects the level of the load current IR and supplies a voltage proportional to this load current IR.

The transistor 52 has a collector connected to the second electrode of the capacitor 1, a base connected to the output terminal of the operational amplifier 34 and an emitter grounded. When the transistor 6 is turned on, the current I1 proportional to the load current IR flows through the transistor 52.

The transistor 53 serves as a constant current source which operates based on the output voltage of the operational amplifier 34. When the output voltage of the operational amplifier 34 increases, the value of the constant current from the transistor 53 increases. When the output voltage of the operational amplifier 34 decreases, on the other hand, the value of the constant current from the transistor 53 decreases.

The transistors 53 and 52 constitute a current mirror circuit. The emitter area of the transistor 53 is set smaller than that of the transistor 52. The current flowing through the transistor 53 is therefore relative to the current I1 which flows through the transistor 52.

A controller 54 includes two PNP transistors 47 and 48, and three NPN transistors 49, 50 and 51. The PNP transistors 47 and 48 have emitters connected to the power supply Vcc and have bases connected together to the collector of the transistor 47. The transistors 47 and 48 constitute a current mirror circuit 46. The collector of the transistor 47 is connected to the collector of the transistor 53. Accordingly, the value of the current flowing through the current mirror circuit 46 varies in accordance with an increase or decrease in the value of the constant current of the transistor 53, i.e., an increase or decrease in load current IR.

The transistor 50 has a collector connected to the collector of the transistor 48, an emitter grounded, and a base connected to the output terminal of the comparator 44. The transistor 51 has a collector connected to the collector of the transistor 48, an emitter grounded, and a base connected to the output terminal of the comparator 45. The transistor 49 has a collector connected to the base of the transistor 6, an emitter grounded, and a base connected to the collector of the transistor 48.

Only when the outputs of the comparators 44 and 45 both are low, therefore, the transistor 49 is turned on by the current from the transistor 48. As the transistor 49 is turned on, the collector current flows through the transistor 49, i.e., the base current IB flows through the transistor 6, turning on the transistor 6.

When the transistor 6 is switched to the OFF status from the ON status, the current supply to the coil 31 from the power supply Vcc is blocked. As a result, counter electromotive force which is negative on the diode side is generated across the coil 31. The counter electromotive force causes a current to flow across the coil 31 via the diode 30, thus charging the capacitor 1. The load current IR flows into the ground as the current I1 via the diode 30, the coil 31 and the transistor 52.

When the transistor 6 is switched to the ON status from the OFF status, a current flows across the coil 31 from the power supply Vcc. This current produces a voltage across the coil 31, which is positive on the diode side. Since the diode 30 is biased in the opposite direction, however, the charges in the capacitor 1 are not affected. The load current IR flows through the capacitor 1 via the load resistor RL and the output terminal VOUT. This load current IR causes the capacitor 1 to be discharged, changing the output voltage V0. The current which is the sum of the load current IR and the coil current flows into the ground via the transistor 52.

According to the second embodiment, when the load current IR is small, the collector current of the transistor 6 also becomes small, reducing the output voltage of the operational amplifier 34. As the output voltage of the operational amplifier 34 decreases, the value of the constant current of the transistor 53 decreases, reducing the value of the current in the current mirror circuit 46. According to this current change, the base current IB of the transistor 6 becomes small, thus preventing the transistor 6 from becoming oversaturated. As a result, the delay in the switching time of the transistor 6 is reduced, so that this DC-DC converter responds quickly to a change in output voltage V0, thereby preventing a sudden variation in output voltage V0. Since the variation in output voltage is small, the duty ratio of the transistor 6 is controlled to be almost constant. This DC-DC converter can therefore suppress a change in harmonic component that is produced by a variation in duty ratio, thereby eliminating the adverse influence on a circuit (e.g., radio frequency circuit) in which this DC-DC converter is employed.

When the load current IR is small, the base current IB of the transistor 6 can be reduced so that the DC-DC converter can reduce the power loss.

According to this embodiment, since the operational delay of the transistor 6 can be prevented, the coil 31 of the DC-DC converter can be made small as well as the switching operation can be improved, thus contributing to making an electronic device compact.

Although only two embodiments of the present invention have been described herein, it should be apparent to those skilled in the art that the present invention may be embodied in many other specific forms without departing from the spirit or scope of the invention. Particularly, it should be understood that the regulator 13 in the second embodiment may be replaced with the regulator as shown in FIG. 12 or FIG. 13.

Therefore, the present examples and embodiments are to be considered as illustrative and not restrictive and the invention is not to be limited to the details given herein, but may be modified within the scope of the appended claims.

What is claimed is:

1. A DC-DC converter having an output terminal to be connected to a load, for producing a desired output voltage at the output terminal based on the voltage from a DC power supply, the converter comprising:

an output capacitor having a first electrode connected to the output terminal and a second electrode;

charge/discharge regulation means for controlling connection between the DC power supply and said output capacitor to permit said output capacitor to be charged or discharged, wherein a potential of said first electrode of said output capacitor is set to the desired output voltage different from a potential of the DC power supply;

first detecting means for detecting a change in output voltage at the output terminal;

second detecting means for detecting a variable load current flowing into the DC-DC converter from the load via the output terminal; and voltage control means for controlling a potential of said second electrode of said output capacitor in such a manner as to nullify a variation in the output voltage, based on a result of detection of said output voltage by said first detecting means and on a result of detection of said load current by said second detecting means, wherein said first detecting means includes:

a voltage-dividing resistor for dividing said output voltage;

an operational amplifier for receiving the divided voltage by said voltage-dividing resistor and for outputting a voltage whose level is relative to a level of said divided voltage;

a capacitor to be charged by a current which is derived from said load current and is controlled in accordance with said output voltage from said operational amplifier;

a transistor for controlling a charged voltage of said capacitor; and a comparator for comparing said charged voltage with a reference voltage provided thereto and for outputting a detection signal.

2. A DC-DC converter having an output terminal to be connected to a load, for producing a desired output voltage at the output terminal based on the voltage from a DC power supply, the converter comprising:

an output capacitor having a first electrode connected to the output terminal and a second electrode;

charge/discharge regulation means for controlling connection between the DC power supply and said output capacitor to permit said output capacitor to be charged or discharged, wherein a potential of said first electrode of said output capacitor is set to the desired output voltage different from a potential of the DC power supply;

first detecting means for detecting a change in output voltage at the output terminal;

second detecting means for detecting a variable load current flowing into the DC-DC converter from the load via the output terminal; and voltage control means for controlling a potential of said second electrode of said output capacitor in such a manner as to nullify a variation in the output voltage, based on a result of detection of said output voltage by said first detecting means and on a result of detection of said load current by said second detecting means, wherein said second detecting means includes:

a capacitor to be charged by a first current which is derived from said load current and is supplied thereto via a resistor;

a transistor for allowing a second current derived from said load current to escape to ground, therein reducing said first current flowing through said resistor; and a comparator for comparing a charged voltage of said capacitor with a reference voltage provided thereto and for outputting a detection signal.

3. A DC-DC converter having an output terminal to be connected to a load, for producing a desired output voltage at the output terminal based on the voltage from a DC power supply, the converter comprising:

an output capacitor having a first electrode connected to the output terminal and a second electrode;

charge/discharge regulation means for controlling connection between the DC power supply and said output capacitor to permit said output capacitor to be charged or discharged, wherein a potential of said first electrode of said output capacitor is set to the desired output voltage different from a potential of the DC power supply;

first detecting means for detecting a change in output voltage at the output terminal;

second detecting means for detecting a variable load current flowing into the DC-DC converter from the load via the output terminal; and voltage control means for controlling a potential of said second electrode of said output capacitor in such a manner as to nullify a variation in the output voltage, based on a result of detection of said output voltage by said first detecting means and on a result of detection of said load current by said second detecting means, wherein said charge/discharge regulation means includes a switching transistor for controlling connection between said DC power supply and said output capacitor; and wherein said first detecting means includes:

a voltage-dividing resistor for dividing said output voltage;

an operation amplifier for receiving the divided voltage by said voltage-dividing resistor and for outputting a voltage whose level is relative to a level of said divided voltage; and a transistor for allowing a current flow therethrough in proportion to said output voltage from said operational amplifier, wherein said switching transistor is controlled based on said current flowing through said transistor.

4. A DC-DC converter having an output terminal to be connected to a load, for producing a desired output voltage at the output terminal based on the voltage from a DC power supply, the converter comprising:

an output capacitor having a first electrode connected to the output terminal and a second electrode;

charge/discharge regulation means for controlling connection between the DC power supply, and said output capacitor to permit said output capacitor to be charged or discharged, wherein a potential of said first electrode of said output capacitor is set to the desired output voltage different from a potential of the DC power supply;

first detecting means for detecting a change in output voltage at the output terminal;

second detecting means for detecting a variable load current flowing into the DC-DC converter from the load via the output terminal; and voltage control means for controlling a potential of said second electrode of said output capacitor in such a manner as to nullify a variation in the output voltage, based on a result of detection of said output voltage by said first detecting means and on a result of detection of said load current by said second detecting means, wherein said second detecting means includes:

a voltage-dividing resistor for dividing said output voltage;

an operational amplifier for receiving the divided voltage by said voltage-dividing resistor and for outputting a voltage whose level is relative to a level of said divided voltage; and a transistor controlled based on said output voltage from said operational amplifier, for allowing a current, derived from said load current, to escape to ground.

5. A DC-DC converter having an output terminal to be connected to a load, for producing a desired output voltage at the output terminal based on the voltage from a DC power supply, the converter comprising:

an output capacitor having a first electrode connected to the output terminal and a second electrode;

charge/discharge regulation means for controlling connection between the DC power supply and said output capacitor to permit said output capacitor to be charged or discharged, wherein a potential of said first electrode of said output capacitor is set to the desired output voltage different from a potential of the DC power supply;

first detecting means for detecting a change in output voltage at the output terminal;

second detecting means for detecting a variable load current flowing into the DC-DC converter from the load via the output terminal; and voltage control means for controlling a potential of said second electrode of said output capacitor in such a manner as to nullify a variation in the output voltage, based on a result of detection of said output voltage by said first detecting means and on a result of detection of said load current by said second detecting means, wherein said voltage control means includes:

a current mirror circuit;

a first transistor for permitting a current from said current mirror circuit to flow to ground, based on detection signals from said first detecting means and said second detecting means;

second transistors for permitting said current from said current mirror circuit to flow to said ground, based on a received rectangular wave signal; and a third transistor for producing a signal for controlling charge/discharge of said output capacitor by said charge/discharge regulation means, based on ON/OFF functions of said first and second transistors.

* * * * *